United States Patent [19]

Waast

[11] 4,375,732
[45] Mar. 8, 1983

[54] DEVICE FOR COMBATTING RODENTS

[76] Inventor: Emile Waast, 47, bis rue de Moulin, F-59246 Mons en Pevele, France

[21] Appl. No.: 283,937

[22] Filed: Jul. 16, 1981

[30] Foreign Application Priority Data

May 21, 1980 [FR] France .................................. 80 11301

[51] Int. Cl.³ .............................................. A01M 1/20
[52] U.S. Cl. .................................................... 43/131
[58] Field of Search .......................... 43/131, 64, 124; 119/53.5, 54

[56] References Cited

U.S. PATENT DOCUMENTS

| 890,430 | 6/1908 | Mann | 43/131 |
| 1,302,160 | 4/1919 | Hedrich et al. | 43/131 |
| 3,269,052 | 8/1966 | Barnhart | 43/131 |
| 4,132,026 | 1/1979 | Dodds | 43/131 |

FOREIGN PATENT DOCUMENTS

| 1402847 | 5/1965 | France | 43/131 |
| 86658 | 2/1966 | France | 43/131 |
| 87384 | 6/1966 | France | 43/131 |
| 1506767 | 11/1967 | France . | |
| 2355450 | 1/1978 | France . | |
| 6617388 | 5/1968 | Netherlands | 43/131 |
| 370277 | 8/1963 | Switzerland | 43/131 |
| 1567803 | 5/1980 | United Kingdom . | |

Primary Examiner—Stephen G. Kunin
Assistant Examiner—J. T. Zatarga
Attorney, Agent, or Firm—Browdy and Neimark

[57] ABSTRACT

A rodent trap comprising a tunnel and a bait container so arranged that a rodent passing through the tunnel either eats the bait or at least physically contacts the bait so that it is later poisoned when it grooms itself of bait adhering to its fur.

7 Claims, 2 Drawing Figures

DEVICE FOR COMBATTING RODENTS

FIELD OF THE INVENTION

The invention relates to a device for combatting rodents.

BACKGROUND OF THE INVENTION

It is well known to combat rodents by placing here and there on the ground, or elsewhere poisoned bait that makes the animals die very quickly after the bait is ingested. Regardless of their mode of action, these baits are very effective, but they are dangerous because, after they have been put in passage ways traversed by rodents, they are accessible not only to these particular animals but also to domestic animals and even to humans, particularly children. Despite their effectiveness, poisoned baits are a means of combatting rodents that should be used with caution.

SUMMARY AND OBJECTS OF THE INVENTION

The invention has as its object a device which, making it possible to combat rodents, can be used in all places where these animals travel and is suitable more particularly, although not exclusively, in food storage places. Thus this device has a particularly advantageous application in storage places for flour and other packaged powdered products for human and animal food.

The invention aims at allowing the use of these baits with total safety. For this purpose, it has as its object a device consisting, in combination, of a tunnel and a bait container communicating with the tunnel under such conditions that the sloping pile of fallen material, formed by the bail product in the tunnel, only partially blocks the tunnel opening. Thus, either the rodent traveling in the tunnel either stops to eat the product and is poisoned almost immediately or else, the rodent continues traveling without stopping, but comes in contact with the product, that partially blocks access through the tunnel. In the latter situation, the rodent's body is more or less covered with the bait products by rubbing against it, during passage through the tunnel and later it is poisoned when it licks itself during grooming.

Various embodiments can be envisaged for this device. Thus, according to one of them, the device consists of a tunnel generally having a parallelepiped shape, one of the side faces of which exhibits, in its median part, an opening communicating with a container, which is integral with said tunnel and extends both laterally in relation to the tunnel and above it. This container can have any size and shape, particularly, for example, a circular section; it is closed in its upper end by a removable plug allowing periodic refilling of bait, particularly in the form of powder or grains.

According to another characteristic of the invention, the tunnel comprises, in the vicinity of the two ends of its lower face, means keeping the bait from being carried outside of the tunnel by the rodents. These means, for example, consist of crossbars.

BRIEF DESCRIPTION OF THE DRAWING

The invention will be better understood and its advantages and other characteristics will be brought out more clearly from the following description, with reference to the accompanying diagrammatic drawing, showing by way of nonlimiting example an embodiment of this device for combatting rodents.

DETAILED DESCRIPTION OF PREFERRED EMBODIMENT

Figure 1:
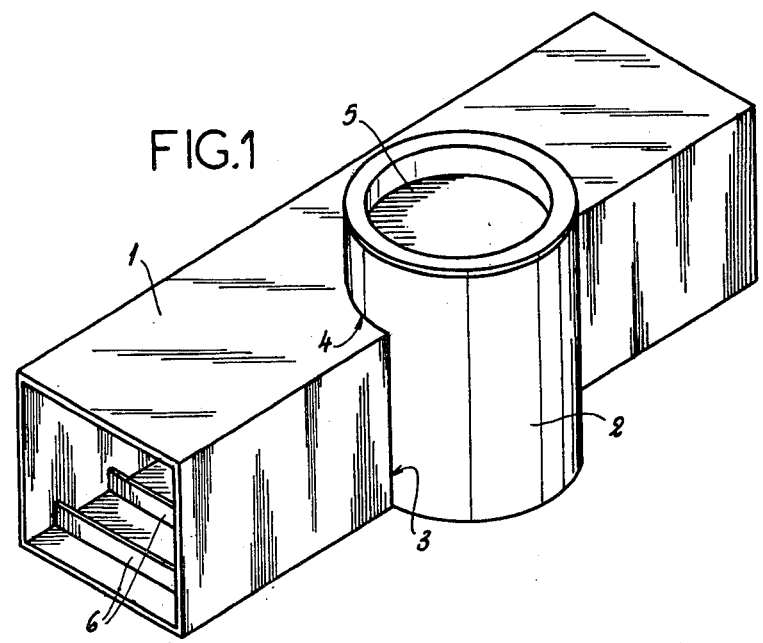
FIG. 1 is a perspective view of a device for combatting rodents.

The device consists of two essential elements that are associated with one another, namely, a tunnel or elongated passage 1 and a container 2. This tunnel 1 and this container 2, each consist of any selected material. particularly, for example, a molded plastic, and in this latter case they can be either molded independently of one another and can then be assembled or else they can be molded in one operation to form an integral assembly.

Regardless of their compositon and fabrication process, tunnel 1 and container 2 are made so that they communicate with one another. For this purpose, tunnel 1, which exhibits a generally elongated parallelepiped shape, has an opening 3 at mid-length of one of its two longitudinal lateral faces and container 2, which exhibits a general cylindrical shape, has an opening 4, due to which communication with tunnel 1 is possible. A removable plug 5 is provided in the upper part of container 2 permitting periodic refilling with bait.

Figure 2:
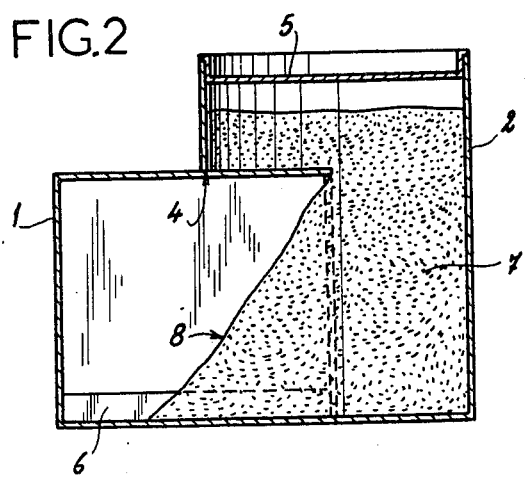
FIG. 2 is a view in cross section of the device shown in FIG. 1.

This container is intended to receive poisoned bait 7, which, for example, is in powder form and which, as shown in FIG. 2, gives rise, in its lower part, to the formation of a sloping pile of fallen material 8, which partially obstructs tunnel 1.

Thus it can be easily be understood that when a rodent travels through tunnel 1, it automatically encounters bait 7; one of two things happens: either it eats a part of this bait which quickly poisons it or else, foregoing this bait, the rodent comes in contact with it and its fur is more or less covered with the bait, which leads to its subsequent poisoning after its first grooming.

It should be noted that crossbars 6 are provided at both ends of tunnel 1 to prevent, on the one hand, the pile 8 of bait 7 from extending outside the tunnel and to prevent, on the other hand, rodents from taking the bait outside this tunnel.

Of course, the invention is not limited to the specific embodiment of this device for combatting rodents indicated above by way of example; on the contrary, it covers all variant embodiments and, of course, extends its field of application to the case where means are provided to allow fastening of the tunnel on the ground or on any other element, acting as a support for it.

I claim:

1. A device for combatting rodents, the combination comprising an elongated tunnel whose axis is generally horizontal in use of the device, said tunnel being of such size and shape that it permits the passage of a rodent to be poisoned therethrough, a poisoned bait container whose axis is generally vertical in use of the device, said bait container being joined to said tunnel and positioned approximately centrally with respect to the axis of said tunnel, the axis of said container being offset from the axis of said tunnel such that the area of juncture between said tunnel and said container involves a substantial portion but less than all of the cross-sectional areas of said tunnel and of said container, said container and said tunnel being in open communication with each other at their region of juncture, said bait containing extending above said tunnel, and a supply of poisoned bait in said container located therein above said tunnel so that said bait spills out of the open end of said container into an unobstructed uncontained loose sloped pile that partially obstructs the cross-sectional area of said tunnel, whereby a rodent passing through said tunnel either eats some bait from said pile or else at least physically contacts the sloped pile of bait obstructing its passage through said tunnel so as to be later poisoned upon grooming itself by the poisoned bait adhering to its body.

2. The device of claim 1, wherein said tunnel is of generally rectilinear cross-sectional shape, and said container is of a round cross-sectional shape.

3. The device of claim 1 or 2, wherein said tunnel is provided with crossbars on its bottom wall extending from side to side across the width of said tunnel.

4. The device of claim 1 or 2, wherein a wall portion extends into said supply of poisoned bait in said container to cause said bait to spill out into said unobstructed uncontained loose sloped pile of poisoned bait.

5. The device of claim 1 or 2, and removable cap means at the upper open end of said container, whereby said container may be readily refilled with poisoned bait.

6. The device of claim 1 or 2, wherein said tunnel and said container are fabricated in one piece by molding of plastic material.

7. The device of claim 1 or 2, wherein said tunnel and said container are separately fabricated and are assembled together to form said device.

* * * * *